(12) United States Patent
Halladay et al.

(10) Patent No.: US 7,041,379 B2
(45) Date of Patent: *May 9, 2006

(54) ROOM TEMPERATURE CURABLE X-HNBR COATING

(75) Inventors: James R. Halladay, Harborcreek, PA (US); Frank J. Krakowski, Erie, PA (US)

(73) Assignee: Lord Corporation, Cary, NC (US)

(*) Notice: Subject to any disclaimer, the term of this patent is extended or adjusted under 35 U.S.C. 154(b) by 233 days.

This patent is subject to a terminal disclaimer.

(21) Appl. No.: 10/655,518

(22) Filed: Sep. 4, 2003

(65) Prior Publication Data

US 2004/0048082 A1    Mar. 11, 2004

Related U.S. Application Data

(62) Division of application No. 10/007,268, filed on Nov. 9, 2001, now Pat. No. 6,709,758.

(51) Int. Cl.
*B32B 15/08* (2006.01)
*B32B 15/82* (2006.01)
*C08L 35/04* (2006.01)

(52) U.S. Cl. ............... 428/463; 428/424.7; 428/424.8; 428/462; 428/501; 428/519; 428/520; 524/565; 524/571; 525/102; 525/123; 525/154; 525/162; 525/163

(58) Field of Classification Search .............. None
See application file for complete search history.

(56) References Cited

U.S. PATENT DOCUMENTS

| 4,581,417 | A | 4/1986 | Buding et al. |
| 4,631,315 | A | 12/1986 | Buding et al. |
| 4,774,288 | A | 9/1988 | Ridland |
| 4,795,788 | A | 1/1989 | Himmler |
| 5,314,741 | A | 5/1994 | Roberts et al. |
| 5,314,955 | A | 5/1994 | Halladay |
| 5,354,808 | A | 10/1994 | Onwumere et al. |
| 5,408,007 | A * | 4/1995 | Mizuno et al. ............. 525/305 |
| 6,777,026 | B1 * | 8/2004 | Halladay et al. ............ 427/180 |
| 6,844,412 | B1 * | 1/2005 | Halladay ..................... 528/25 |
| 2003/0104231 | A1 | 6/2003 | Krakowski et al. |
| 2003/0105218 | A1 * | 6/2003 | Halladay et al. ............ 524/589 |

FOREIGN PATENT DOCUMENTS

WO    01/55266    8/2001

OTHER PUBLICATIONS

David A. Ley, Denise E. Fiori, Richard J. Quinn: "Optimization of Acrylic Polyols for Low VOC Two-Component Water Reducible Polyurethane Coatings Using Tertiary Isocyanate Crosslinkers" Progress in Organic Coatings, vol. 35, 1999, pp. 109-116, XP001153054.

* cited by examiner

Primary Examiner—Jeffrey B. Robertson
(74) Attorney, Agent, or Firm—Todd W. Galinski

(57) ABSTRACT

Elastomer coating composition are disclosed which cure at room temperature, and form highly flex-resistant, durable, and flexible protective layer on elastomers and provides excellent adhesion to elastomeric and metal substrates. The coating is a solvent solution of (A) a carboxylated hydrogenated acrylonitrile-butadiene copolymer, and (B) a room temperature isocyanate curing component. Coated bonded elastomer-metal composites are obtained without an additional application of heat to cure the coating.

31 Claims, No Drawings

ROOM TEMPERATURE CURABLE X-HNBR COATING

CROSS REFERENCE

This application is a division of U.S. patent application Ser. No. 10/007,268, filed Nov. 9, 2001, now U.S. Pat. No. 6,709,758, granted Mar. 23, 2004.

FIELD OF THE INVENTION

Background of the Invention

Elastomeric materials are utilized in numerous industrial applications. For example, elastomeric materials are utilized in the manufacture of various hoses, seals, mounting, damping and insulating devices found in the engine compartments of automobiles and other vehicles. In addition, devices for mounting the engines within these vehicles typically comprise one or more metal parts adhesively bonded to one or more vulcanized elastomeric parts. In these and many other industrial applications utilizing vulcanized elastomeric materials, the elastomeric materials are typically exposed to corrosive and degrading materials such as various solvents, oils and fuels. Elastomeric materials have a tendency to degrade when exposed to these types of materials, and there is a continuing search within the elastomer industry to create an elastomer which is resistant to corrosive materials.

One method of rendering elastomeric materials resistant to corrosive materials is to apply a protective coating to the elastomeric material. Various corrosion-resistant coatings previously utilized for both flexible substrates (e.g., elastomeric substrates) and rigid substrates (e.g., steel, stainless steel, aluminum or plastic) include polyurethanes, polysulfides and fluorocarbon elastomers. When applied to rigid substrates, traditional corrosion-resistant coatings such as fluorocarbon elastomers have been found to provide excellent resistance to oil and fuel. However, when applied to flexible elastomeric substrates such as natural rubber or polybutadiene, the fluorocarbon elastomers suffer from poor fatigue resistance, poor low temperature characteristics, and poor adhesion to the natural rubber or polybutadiene substrate.

U.S. Pat. No 4,774,288 discloses a hydrogenated copolymer of a conjugated diene and an α,β-unsaturated nitrile containing an active phenol-formaldehyde resin vulcanization system. The disclosure is directed to the bulk vulcanizate, which is characterized as having good compression set properties and a good resistance to oils and good resistance to oxidative attack in air at elevated temperature aging under oxidizing conditions, however no mention is made suggesting that solvent borne coatings could be formed on flexible elastomeric substrates such as natural rubber and polybutadiene which might provide useful properties.

U.S. Pat. No. 5,314,955 discloses a coating composition consisting of (a) a hydrogenated acrylonitrile-butadiene copolymer, (b) a phenolic resin, (c) a curing component, and (d) a solvent. This coating solves many of the problems of adhesion to rubber substrates combined with fatigue resistance and fuel resistance. One of the drawbacks of this coating composition is that it requires a high temperature bake to cure the coating and to promote adhesion to adjacent metal surfaces. Some parts such as helicopter rotor bearings are damaged by the high temperature bake. The high temperature bake is also costly in production since it adds a time delay and additional handling of the parts. There still exists a need for improved protective coatings for flexible elastomeric substrates such as natural rubber and polybutadiene that are resistant to fatigue and temperature variability, and that exhibit effective adhesion to the substrate, and that cure at room temperature.

SUMMARY OF THE INVENTION

The coating composition of the invention is resistant to fatigue and temperature variability and provides for excellent adhesion to flexible elastomeric substrates and it cures at room temperature. More specifically, the coating composition of the invention comprises (A) a carboxylated hydrogenated acrylonitrile-butadiene copolymer, (X-HNBR) (B) a curing component which contains at least one isocyanate group and a group which forms crosslinks, and (C) a solvent. In another aspect, there is a method for coating a substrate comprising applying the aforementioned solvent-based coating to the surface of a vulcanized rubber substrate which is bonded to metal, drying the coating and allowing the dried coating to cure at ambient conditions, optionally with application of heat. It is preferred to provide the coating also onto the portion of exposed metal around the periphery of the elastomer. The present invention provides coatings for elastomer-metal composites with excellent adhesion to the elastomer substrate, resistance to corrosive materials and resistance to flex-fatigue over a wide temperature range.

DETAILED DESCRIPTION OF THE INVENTION (A) X-HNBR

To provide the ethylenically unsaturated nitrile-conjugated diene rubber with high saturation, the hydrogenation of carboxylated nitrile butadiene rubber is conducted. The hydrogenation serves to saturate at least 80 of the unsaturated bonds of the rubber. When the degree of saturation is less than 80%, the rubber's heat resistance is low, and when it exceeds a preferred value of 99%, the rubber's elasticity shown by compression set, etc. is decreased too much. The more preferred degree of saturation of the rubber is 90–98%.

The conjugated dienes useful for preparing the carboxylated acrylonitrile-butadiene copolymers which are further hydrogenated can be any of the well-known conjugated dienes including 1,3-butadiene; 2-methyl-1,3-butadiene, 2,3-dimethyl-1,3-butadiene; 1,3-pentadiene; 1,3-hexadiene; 2,4-hexadiene; 1,3-heptadiene; piperylene; and isoprene, with 1,3-butadiene presently being preferred.

Carboxyl groups are present in the X-HNBR from α,β-unsaturated monocarboxylic acids with 3 to 5 C-atoms such as acrylic acid, methacrylic acid and crotonic acid and/or other known carboxyl group-containing monomers such as, but not limited to α,β-unsaturated dicarboxylic acids with 4 to 5 C-atoms, e.g., maleic acid, fumaric acid, citraconic acid and itaconic acid. The bound unsaturated carboxylic acid may be present in an amount of from about 1 to about 10 weight percent of the copolymer, with this amount displacing a corresponding amount of the conjugated diolefin.

Further, a third optional monomer may be used in production of the polymer. Preferably, the third monomer is an unsaturated mono- or di-carboxylic acid derivative (e.g., esters, amides and the like).

The unsaturated nitrile comonomer copolymerized to form a carboxylated acrylonitrile-diene copolymer typically correspond to the following formula:

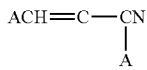

wherein each A is hydrogen or a hydrocarbyl group having from 1 to about 10 carbon atoms. Examples of A groups include alkyl and cycloalkyl, such as methyl, ethyl, isopropyl, t-butyl, octyl, decyl, cyclopentyl, cyclohexyl, etc., and aryls such as phenyl, tolyl, xylyl, ethylphenyl, t-butylphenyl, etc. Acrylonitrile and methacrylonitrile are the presently preferred unsaturated nitrites.

The X-HNBR copolymers are polymerized by reaction of the any of the aforementioned exemplary conjugated dienes, unsaturated nitrile and unsaturated carboxyl-group containing comonomers in the presence of a free radical initiator by methods well known to those skilled in the art. Suitable free radical initiators are beyond the scope of this disclosure, and are typically organic oxides, peroxides, hydroperoxides, and azo compounds, etc., such as hydrogen peroxide, benzoyl peroxide, cumene hydroperoxide, di-tert-butyl peroxide, ascaridole, acetyl peroxide, tert-butyl hydroperoxide, trimethylamine oxide, dimethyl-aniline oxide, isopropylperoxydicarbonate, diisobutylene ozonide, peracetic acid, nitrates, chlorates, perchlorates, azobisisobutyronitrile, etc.

The preferred commercially available X-HNBR is made from a carboxylated nitrile-diene copolymer that is hydrogenated in two steps. It is known that the C—C double bonds of the 1,2-vinyl-configured butadiene units in NBR are hydrogenated very rapidly, followed by the 1,4-cis configured units. The 1,4-trans configured butadiene units are hydrogenated comparatively slowly. The NBR products used for hydrogenation are distinguished by a predominant proportion of the 1,4-trans configured double bonds.

In the 2-stage hydrogenation carbon-to-carbon double bonds are first reduced, followed by reduction of the carbon-to-nitrogen bond. As is known in the art, this procedure avoids the gelation of the hydrogenated polymers which may occur if the reduction is carried out in one step. In the first step, a different catalyst may be used, for example, a palladium or ruthenium catalyst. If desired, however, the nitrile groups alone may be reduced by proper choice of the catalyst, leaving unsaturated carbon-to-carbon bonds in the linear polymeric chain. It is possible also to use a combination of noble metal and nickel or cobalt, operating first at a relatively low temperature, then at a higher temperature. Other techniques for hydrogenating acrylonitrile-butadiene copolymers are disclosed in, for example, U.S. Pat. Nos. 4,581,417; 4,631,315; and 4,795,788; the disclosures of which are incorporated herein by reference.

The most preferred acrylonitrile-butadiene copolymers are typically hydrogenated to an extent such that the final product has an unsaturation level of from about 1 to 20 mole percent, preferably from about 3 to about 7 mole percent.

Carboxylated hydrogenated nitrile rubber (hereinafter referred to as "X-HNBR") is manufactured by Bayer under a trade name of "Therban", for example Therban KA 8889. X-HNBR may have an iodine value of preferably about 50% or less, more preferably about 3 to 40%, most preferably from about 8 to 30%. Resistance against heat and demanding solvents can be increased when X-HNBR having a iodine value of 50% or less (high hydrogenation ratio) is used, and rubber elasticity at a low temperature can be maintained by the use of the X-HNBR rubber having a low hydrogenation ratio. The central value of the nitrile content of HNBR is preferably from about 15 to 60%, more preferably from about 30 to 55%, most preferably from about 40 to 50%. Resistance against solvents can be increased by the use of HNBR having a nitrile content of about 15% or more, particularly about 30% or more, and low-temperature resistance can be kept by the use of the rubber having a nitrile content of about 60% or less, particularly about 50% or less. In addition, its Mooney viscosity as the central value of $ML_{1+4}$ (100° C.) (hereinafter referred to as "Mooney viscosity") is preferably from about 40 to 100, and for a coating, lower Mooney viscosity of 40–60 is preferred. When X-HNBR having a Mooney viscosity falling within this range is used, the coating composition exhibits high resistance against organic liquids and good flexibility and low-temperature resistance.

(B) Curing Component

The curing component contains at least one isocyanate group and a groups that forms crosslinks with X-HNBR. The preferred curing component contains at least one isocyanate group or a group bearing an isocyanate group, and a carboxyl-reactive crosslinking group. The curing component is best used at a level of from 3 to 30 wt. parts per 100 wt. parts of said carboxylated hydrogenated copolymer of a conjugated diene, unsaturated nitrile and carboxyl monomer.

An exemplary class of curing component capable of curing at low temperatures is the di- and polyisocyanates which include aliphatic, cycloaliphatic and aromatic isocyanate functional compounds. Aromatic polyisocyanates are preferred. Specific examples of di- or polyisocyanates include, without limitation, aliphatic polyisocyanates such as 1,6-hexamethylene diisocyanate; 1,8-octamethylene diisocyanate; 1,12-dodecamethylene diisocyanate; 2,2,4-trimethylhexamethylene diisocyanate, and the like; 3,3'-diisocyanatodipropyl ether; 3-isocyanatomethyl-3,5,5'-trimethylcyclodexyl isocyanate; hexamethylene diisocyanate; 4,4'-methylenebis(cyclohexyl isocyanate); cyclopentalene-1,3-diisocyanate;cyclodexylene-1,4'-diisocyanate; methyl 2,6-diisocyanatocaprolate; bis-(2-isocyanatoethyl)-fumarate; 4-methyl-1,3diisocyanatocyclohexane; trans-vinylene diisocyanate and similar unsaturated polyisocyanates; 4,4'-methylene-bis(cyclohexylisocyanate) and related polyisocyanates; methane diisocyanates; bis-(2-isocyanatoethyl) carbonate and similar carbonate polyisocyanates; N,N',N"-tris-(6-isocyanatohexamethylene)biuret and related polyisocyanates. Aromatic di- and polyisocyanates include toluene diisocyanates; xylene diisocyanates;dianisidine diisocyanate; 4,4'-diphenylmethane diisocyanate; 1-ethoxy-2,4-diisocyanatobenzene; 1-chloro-2,4-diisocyanatobenzene; bis(4-isocyanatophenyl)methane; tris(4-isocyanatophenyl) methane; naphthalene diisocyanates; 4,4'-biphenyl diisocyanate; phenylene diisocyanates such as m- and p-phenylene diisocyanate; 3,3'-dimethyl-4,4'-biphenyl diisocyanate; p-isocyanatobenzoyl isocyanates; tetrachloro-1,3-phenylene diisocyanate; 2,4-toluene diisocyanate,2,6-toluene diisocyanate, 4,4'-isocyanate,bis[isocyanatopheny] methane polymethylene poly(phenyl isocyanate), isophrone diisocyanate, and other aliphatic, heterocyclic and aromatic polyisocyanates, and including mixtures of such polyisocyanates.

Specific examples of available diisocyanates may be mentioned, are 1,6-hexane diisocyanate (commercially available, for example, under the trade designation HMDI from Bayer), isophorone diisocyanate (commercially available, for example, under the trade designation IPDI from Huls), tetramethylxylene diisocyanate (commercially available, for example, under the trade designation m-TMXDI from Cytec), 2-methyl-1,5-pentane diisocyanate, 2,2,4-trimethyl-1,6hexane diisocyanate, 1,12-dodecane diisocyanate and methylene bis(4-cyclohexyl isocyanate) (commercially available, for example, Desmodur® W from Bayer), and higher functional isocyanates such as a biuret of 1,6-hexane diisocyanate (commercially available, for example, as Desmodur® N from Bayer), an isocyanurate of 1,6-hexane diisocyanate (commercially available, for example, as Desmodur® N-3390 from Bayer), an isocyanurate of isophorone diisocyanate (commercially available, for example, as Desmodur® Z-4370 from Bayer), a reaction product of tetramethylxylene diisocyanate and trimethylol propane (commercially available, for example, as Cythane® 3160 from Cytec), and a reaction product of one mole of trimethylol propane and 3 moles of toluene diisocyante (commercially available, for example, as Desmodur® L from Bayer). The amount of di- or polyisocyanate included should be from 3 to 30 phr. Preferably the amount is from 8 to 15 phr.

Another class of curing components are the various known organosilanes which contain an isocyanate group and another group capable of forming crosslinks, such as a hydrolysable group, namely halogen, hydroxy, alkoxy, or acyloxy group; an epoxy-containing group; a mercapto group; a mercapto-containing group; a vinyl group; a vinyl-containing group; another isocyanate group; another isocyanate-containing group; an ureido group; an ureido-containing group; an imidazole group; or an imidazole-containing group. Such compounds are known in the art.

The preferred crosslink-forming group of the isocyanatosilane is an alkoxy group. Examples of commercially available isocyanato-alkoxy silanes which are suitable herein include gamma-isocyanatopropyltrimethoxysilane, available as Silquest® Y-5187 from OSi Specialties Group, a Witco company (OSi), and gamma-isocyanatopropyltriethoxysilane, available as Silquest® A-1310, also from OSi.

(C) Solvent

The solvent useful as the carrier vehicle for the coating composition of the present invention can essentially be any organic solvent or other material known to dissolve acrylonitrile-butadiene copolymers. Examples of organic solvents useful in the present invention include ketones such as methylethyl ketone, methylisobutyl ketone, and diisobutyl ketone; acetates such as butyl acetate; toluene, xylene and their derivatives; nitropropane; and ethylene dichloride.

The solvent of the present invention is typically utilized at 70% to 97% by weight of the total coating composition, and preferably from 80% by weight to 90% by weight such that the coating composition has a total nonvolatile solids content ranging from about 3 to 30 percent, and preferably from about 6 to 15 percent.

The coating composition of the present invention may contain other optional ingredients such as metal oxides, antioxidants and particulate reinforcements like carbon black and pigments like $TiO_2$. Specific examples of metal oxides include zinc oxide, magnesium oxide, zinc sulfate, and lead oxide, while specific examples of particulate reinforcements useful in the invention include carbon black, precipitated silica, and fumed silica. The optional particulate reinforcement may be utilized in various amounts up to about 50 percent by weight of the carboxylated hydrogenated acrylonitrile-butadiene copolymer.

The coating composition may be prepared by simply mixing the ingredients by hand with a spatula or the like or by mechanical mixing or shaking. The coating composition is typically applied to an elastomeric material and/or other substrate by dipping, spraying, wiping, brushing or the like, after which the coating is allowed to dry for a period of time typically ranging from about 30 minutes to 2 hours, preferably from about 45 minutes to 1 hour. The coating composition is typically applied to form a dry layer on the substrate having a thickness ranging from about 0.1 to 5 mils, preferably from about 0.5 to 1.5 mils.

The coating composition will cure within about 2 to 24 hours at room temperature. The cure can be accelerated by exposing the coating to elevated temperatures, but this is not required.

Substrates

The coating composition of the present invention is particularly suitable for coating engine mounting devices which are comprised of vulcanized elastomeric parts that have been bonded to metal parts. The compositions are particularly effective coatings on cured elastomers with limited oil and solvent resistance. Such elastomers include natural rubber, styrene butadiene rubber, polybutadiene rubber, ethylene propylene and ethylene propylene diene rubber, polyisobutylene-isoprene rubber, polychloroprene, low acrylonitrile content (<35%) nitrile-butadiene rubbers; and the like. The coating composition may also be used over rigid substrates such as metals, plastics, ceramics, and composites. This is particularly useful for bonded rubber mounts which contain both elastomeric and rigid components.

Preparation of Elastomer Substrate for Coating

The elastomeric surface or substrate to be coated may optionally be pretreated with a chlorinating agent such as sodium hypochlorite and hydrochloric acid. The use of various chlorinating agents to prepare elastomeric materials for application of a coating composition is well known in the art. One example of a chlorinating agent is commercially available from Lord Corporation under the tradename CHEMLOK 7701. The chlorinating agent may be applied to the surface of the elastomeric material by brushing, dipping, spraying, wiping, or the like, after which the chlorinating agent is allowed to dry. Chlorinating agents tend to be very volatile and typically dry within a matter of seconds or minutes.

The coating compositions of the present invention have the surprising ability to adequately bond to both the flexible elastomeric part and the rigid metal part so that the boundary between the elastomer and metal can be adequately protected by the coating composition. The present invention is therefore distinguished from many traditional protective coating compositions which only have the ability to bond to one type of substrate to be protected.

The following examples are provided for purposes of illustrating the present invention and shall not be constructed to limit the scope of the invention which is defined by the claims.

EXAMPLE 1

The following example was prepared using Zetpol 2220, an X-HNBR produced by Zeon Chemical. A suitable substitute is Therban® KA 8889.

An elastomer coating solution was prepared as follows:

| Ingredient | Description | PHR |
|---|---|---|
| X-HNBR | carboxylated hydrogenated nitrile-butadiene | 100.0 |

This formulation was dissolved in Methyl Isobutyl Ketone (MIBK, CAS No. 108-10-1) to a solids content of 12.0% by weight.

To 40 grams of solution, of bis-[isocyanatopheny] methane (diisocyanate), 53% in xylene was added at 0.1 g, 0.5 g and 1.0 g levels. At 0.1 g. diisocyanate level, the solution cured at room temperature in less than 16 hours. At 0.5 g, the solution cured in 30 minutes.

To 40 grams of solution, 3-isocyanatopropyltriethoxysilane, CAS # 24801-88-5, was added at 0.3, 0.7, 1.0, and 1.3 gram quantities. At all levels, the coating composition starts to cure within 45 minutes to one hour and was fully cured in less than 16 hours.

Fuel Resistance Testing

The coatings were tested on a 55 durometer natural rubber compound (A135Q) which had been treated with Chemlok® 7701. The coating was then compared against commercial fluorocarbon coating PLV-2100, and a commercial HNBR SPE XV coating taught according to U.S. Pat. No. 5,314,955 and an uncoated control.

When immersed in Jet A fuel for 24 hours at room temperature, the following volume % swell results obtained are:

| | |
|---|---|
| Control Uncoated | 192.9% |
| Control PLV 2100 | 0.1% |
| Control HNBR SPE XV | 33.6% |
| Example Coating with bis-[isocyanatopheny] methane | 2.2% |
| Example Coating with 3-isocyanatopropyltriethoxysilane | 2.3% |

Adhesion Testing

Rubber adhesion was tested by bonding two one-inch-wide strips together, and by pulling in a 180° peel. The rubber strips were made from a 55 durometer commercial natural rubber compound (A135Q) which had been treated with Chemlok® 7701. An approximate two-inch-long section was coated; each strip was placed in contact with each other and a 472 g weight applied to ensure intimate contact. The weight was left in place for ten minutes. After 8 days drying time, each strip was pulled apart in the Tinius Olsen® tensile tester. The following table records the results.

| Coating Type | Peel Results, Lbf |
|---|---|
| Control PLV 2100 | 2.03 |
| Control HNBR SPE XV | 8.52 |
| Example Coating with bis-[isocyanatopheny] methane | 15.5 |
| Example Coating with 3-isocyanatopropyltriethoxysilane | 21.1 |

Metal adhesion was tested in shear by bonding a one-inch wide rubber strip to a one-inch metal coupon with one square inch of overlap. The rubber strips were made from a 55 durometer natural rubber compound (A135Q) which had been treated with Chemlok® 7701. The metal coupons were 304 stainless steel. Stainless was chosen because it is known to be a difficult substrate to bond to. After coating, each was placed in contact with each other and a 472 g weight applied to ensure intimate contact. The weight was left in place for ten minutes. After 8 days drying time, each specimen was pulled apart in the Tinius Olsen tensile tester.

| Coating Type | Adhesion Results, psi |
|---|---|
| Control PLV 2100 | 16.78 |
| Control HNBR SPE XV | 19.23 |
| Example Coating with bis-[isocyanatopheny] methane | 18.2 |
| Example Coating with 3-isocyanatopropyltriethoxysilane | 18.5 |

Ozone Resistance

Ozone testing was done using a dynamic ozone test (ASTM-D3395) at 50 pphm ozone at 104° F.

Specimens were based on a 55 durometer commercial sulfur-cured natural rubber/polybutadiene blend protected with antiozonant wax and an alkyl-aryl phenylene-diamine antiozonant (M122N). Under dynamic conditions, it appears that the carboxylated hydrogenated coating is more effective as an ozone barrier than the HNBR coating SPE XV.

Cracking Initiated

| Cracking initiated | |
|---|---|
| Control Uncoated | 6.5 hrs. |
| Control HNBR SPE XV | 6.5 hrs. |

Example 1 Coating with bis-[isocyanatopheny] methane was uncracked at 28 hrs

Example 1 Coating with 3-Isocyanatopropyltriethoxysilane was Uncracked at 28 hrs.

Besides having low adhesion values, the PLV 2100 coating cracks and delaminates from the rubber surface after flexing. Unpierced DeMattia flex specimens (made from a 55 durometer natural rubber compound) were coated with these same coatings and flexed in accordance with ASTM D-813. The PLV2100 coating was severely cracked and delaminated, exposing the substrate in less than 4000 cycles. Both the baked HNBR SPE XV and Example 1 ran 80,000 cycles at which point the natural rubber substrate was cracked. There was no sign of delamination in either of the Example coatings.

What is claimed is:

1. A solvent-based coating composition comprising 3 to 30 weight percent of solids, said solids comprising (a) a carboxylated hydrogenated copolymer comprising repeating units from a conjugated diene, an unsaturated nitrile, and a carboxyl monomer, (b) a curing component containing at least one isocyanate group and another group which forms crosslinks, and (C) a solvent.

2. The coating composition according to claim 1, wherein the conjugated diene is 1,3-butadiene; 2,3-dimethylbutadiene; 1,3pentadiene; 1,3-hexadiene; 2,4-hexadiene; 1,3-heptadiene; piperylene; or isoprene.

3. The coating composition according to claim 2, wherein the conjugated diene is 1,3-butadiene.

4. The coating composition according to claim 1, wherein the unsaturated nitrile corresponds to the following formula:

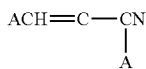

wherein each A, independently, is hydrogen or a hydrocarbyl group having from 1 to about 10 carbon atoms.

5. The coating composition according to claim 1, wherein the unsaturated nitrile is acrylonitrile or methacrylonitrile.

6. The coating composition according to claim 1, wherein the carboxylated hydrogenated copolymer has an unsaturation level between about 0.1 and 20 mole percent.

7. The coating composition according to claim 6, wherein the unsaturation level is between about 3 and 7 mole percent.

8. The coating composition according to claim 1, wherein the solvent is a ketones; an acetate; toluene; xylene and their derivatives; nitropropane; or ethylene dichloride.

9. The coating composition of claim 1, wherein said curing component is a di- or polyisocyanate.

10. The coating composition of claim 9, wherein said di- or polyisocyanate is 1,6-hexamethylene diisocyanate; 1,8octamethylene diisocyanate; 1,12-dodecamethylene diisocyanate; 2,2,4trimethylhexamethylene diisocyanate; 3,3'-diisocyanatodipropyl ether; 3-isocyanatomethyl-3,5,5'-trimethylcyclodexyl isocyanate; hexamethylene diisocyanate; 4,4'-methylenebis(cyclohexyl isocyanate); cyclopentalene-1,3diisocyanate; cyclodexylene-1,4'-diisocyanate; methyl 2,6-diisocyanatocaprolate; bis-(2-isocyanatoethyl)-fumarate; 4-methyl-1,3-diisocyanatocyclohexane; trans-vinylene diisocyanate; 4,4'-methylene-bis(cyclohexylisocyanate); methane diisocyanates; bis-(2-isocyanatoethyl) carbonate; N,N',N"-tris-(6-isocyanatohexamethylene) biuret, toluene diisocyanate; xylene diisocyanate; dianisidine diisocyanate; 4,4'-diphenylmethane diisocyanate; 1-ethoxy-2,4-diisocyanatobenzene; 1-chloro-2,4diisocyanatobenzene; bis(4-isocyanatophenyl)methane; tris(4-isocyanatophenyl)methane; naphthalene diisocyanate; 4,4'-biphenyl diisocyanate; m-phenylene diisocyanate; p-phenylene diisocyanate; 3,3'-dimethyl-4,4'-biphenyl diisocyanate; p-isocyanatobenzoyl isocyanate; tetrachloro-1,3-phenylene diisocyanate; 2,4-toluene diisocyanate,2,6-toluene diisocyanate, 4,4'-isocyanate; bis[isocyanatopheny] methane polymethylene poly(phenyl isocyanate), or isophrone diisocyanate; or mixtures thereof.

11. The coating composition of claim 9, wherein said di- or polyisocyanate is present at from 3 to 30 wt. parts per 100 wt. parts of said carboxylated hydrogenated copolymer of a conjugated diene, unsaturated nitrile and carboxyl monomer.

12. The coating composition of claim 10, wherein said di- or polyisocyanate is present at from 8 to 15 wt. parts per 100 wt. parts of said carboxylated hydrogenated copolymer of a conjugated diene, unsaturated nitrile and carboxyl monomer.

13. The coating composition of claim 1, wherein said curing component is an organosilane which contains an isocyanate group and another group capable of forming crosslinks.

14. The coating composition of claim 13, wherein said group capable of forming crosslinks is a hydrolysable group, and wherein the hydrolysable group is a halogen, hydroxy, alkoxy, or acyloxy group.

15. The coating composition of claim 13, wherein said group capable of forming crosslinks is an epoxy-bearing group, a mercapto group, a mercapto-bearing group, a vinyl group, a vinyl-bearing group, another isocyanate group, an isocyanate-bearing group, an ureido group, an ureido-bearing group, an imidazole group or an imidazole-bearing group.

16. The coating composition of claim 13, wherein said organosilane is an isocyanato-alkoxy silane.

17. The coating composition of claim 16, wherein said isocyanate-alkoxy silane is gamma-isocyanatopropyltrimethoxysilane or gamma-isocyanatopropyltriethoxysilane.

18. A method of coating a substrate comprising applying the solvent-based coating composition of claim 1 to the surface of a vulcanized rubber substrate which is bonded to metal, drying the coating and allowing said dried coating to cure at ambient conditions, optionally with application of heat.

19. The coating composition of claim 3, wherein the carboxylated hydrogenated copolymer has an unsaturation level between about 0.1 and 10 mole percent.

20. The coating composition of claim 19, wherein the unsaturation level is between about 3 and 7 mole percent.

21. The coating composition according to claim 2, wherein the solvent used is a ketone; an acetate; toluene, xylene and their derivatives; nitropropane; ethylene dichloride, or mixtures thereof.

22. The coating composition according to claim 21, wherein said curing component is a di- or polyisocyanate.

23. The coating composition of claim 22, wherein said di- or polyisocyanate is 1,6-hexamethylene diisocyanate; 1,8octamethylene diisocyanate; 1,12-dodecamethylene diisocyanate; 2,2,4trimethylhexamethylene diisocyanate; 3,3'-diisocyanatodipropyl ether; 3-isocyanatomethyl-3,5,5'-trimethylcyclodexyl isocyanate; hexamethylene diisocyanate; 4,4'-methylenebis(cyclohexyl isocyanate); cyclopentalene-1,3diisocyanate; cyclodexylene-1,4'-diisocyanate; methyl 2,6-diisocyanatocaprolate; bis-(2-isocyanatoethyl)-fumarate; 4-methyl-1,3-diisocyanatocyclohexane; trans-vinylene diisocyanate; 4,4'-methylene-bis(cyclohexylisocyanate); methane diisocyanates; bis-(2-isocyanatoethyl) carbonate; N,N',N"-tris-(6-isocyanatohexamethylene) biuret, toluene diisocyanate; xylene diisocyanate; dianisidine diisocyanate; 4,4'-diphenylmethane diisocyanate; 1-ethoxy-2,4-diisocyanatobenzene; 1-chloro-2,4diisocyanatobenzene; bis(4-isocyanatophenyl)methane; tris(4-isocyanatophenyl)methane; naphthalene diisocyanate; 4,4'-biphenyl diisocyanate; m-phenylene diisocyanate; p-phenylene diisocyanate; 3,3'-dimethyl-4,4'-biphenyl diisocyanate; p-isocyanatobenzoyl isocyanate; tetrachloro-1,3-phenylene diisocyanate; 2,4-toluene diisocyanate, 2,6-toluene diisocyanate, 4,4'-isocyanate; bis[isocyanatopheny] methane polymethylene poly(phenyl isocyanate), or isophrone diisocyanate; or mixtures thereof.

24. The coating composition according to claim 23, wherein said di- or polyisocyanate is present at from 3 to 30 wt. parts per 100 wt. parts of said carboxylated hydrogenated copolymer of a conjugated diene, unsaturated nitrile and carboxyl monomer.

25. The coating composition according to claim 24, wherein said di- or polyisocyanate is present at from 8 to 5 wt. parts per 100 wt. parts of said carboxylated hydrogenated copolymer of a conjugated diene, unsaturated nitrile and carboxyl monomer.

26. The coating composition according to claim 4, wherein said curing component is an organosilane which contains an isocyanate group and another group capable of forming crosslinks.

27. The coating composition of claim 26, wherein said group capable of forming crosslinks is a hydrolysable group, and wherein the hydrolysable group is a halogen, hydroxy, alkoxy, or acyloxy group.

28. The coating composition of claim 4, wherein said group capable of forming crosslinks is an epoxy-bearing group, a mercapto group, a mercapto-bearing group, a vinyl group, a vinyl-bearing group, another isocyanate group, an isocyanate-bearing group, an ureido group, an ureido-bearing group, an imidazole group or an imidazole-bearing group.

29. The coating composition according to claim 4, wherein said curing component is an isocyanatosilane.

30. The coating composition according to claim 29, wherein said isocyanatosilane is an isocyanate-alkoxy silane.

31. The coating composition according to claim 30, wherein said isocyanate-alkoxy silane is gamma-isocyanato-propyltrimethoxysilane or gamma-isocyanatopropyltri-ethoxysilane.

* * * * *